(12) United States Patent
Siemens et al.

(10) Patent No.: US 11,661,996 B2
(45) Date of Patent: May 30, 2023

(54) ASSEMBLY FOR A HYBRID DRIVETRAIN OF A MOTOR VEHICLE

(71) Applicant: ZF FRIEDRICHSHAFEN AG, Friedrichshafen (DE)

(72) Inventors: Kyrill Siemens, Würzburg (DE); Nikolaj Knaus, Schweinfurt (DE); Martin Lobenstein, Schweinfurt (DE); Christian Struck, Römhild (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 30 days.

(21) Appl. No.: 17/627,019

(22) PCT Filed: Jul. 16, 2020

(86) PCT No.: PCT/EP2020/070186
§ 371 (c)(1),
(2) Date: Jan. 13, 2022

(87) PCT Pub. No.: WO2021/009304
PCT Pub. Date: Jan. 21, 2021

(65) Prior Publication Data
US 2022/0252134 A1   Aug. 11, 2022

(30) Foreign Application Priority Data

Jul. 18, 2019 (DE) ..................... 10 2019 210 604.8

(51) Int. Cl.
*F16F 15/14* (2006.01)
*B60K 6/38* (2007.10)

(52) U.S. Cl.
CPC .............. *F16F 15/145* (2013.01); *B60K 6/38* (2013.01); *F16F 2230/0005* (2013.01); *F16F 2230/0011* (2013.01); *F16F 2234/00* (2013.01)

(58) Field of Classification Search
CPC ...................... F16F 2230/0011; F16F 2234/00
See application file for complete search history.

(56) References Cited

U.S. PATENT DOCUMENTS

| 4,770,353 A | 9/1988 | Steffens |
| 2008/0017157 A1 | 1/2008 | Masuda |
| 2018/0245664 A1* | 8/2018 | Weller .................. F16F 15/145 |

FOREIGN PATENT DOCUMENTS

| CN | 109416114 | 3/2019 |
| DE | 3632805 | 4/1990 |

(Continued)

*Primary Examiner* — Vicky A Johnson
(74) *Attorney, Agent, or Firm* — Cozen O'Connor

(57) ABSTRACT

An assembly for a hybrid drivetrain of a motor vehicle, having a first torque transmission device and a second torque transmission device connected thereto so as to transmit torque. The first torque transmission device is arranged to be axially spaced apart from the second torque transmission device and the second torque transmission device has a smaller radial extension than the first torque transmission device. An installation space for a drivetrain device is defined radially above the second torque transmission device such that said drivetrain device is delimited axially by the first torque transmission device. A spacer device is arranged between the two torque transmission devices in the torque transmission path for axial spacing and is designed such that an axially definable minimum spacing between the defined installation space and the first torque transmission device is maintained and has a balancing device for compensating for imbalance of the assembly.

14 Claims, 4 Drawing Sheets

(56) References Cited

FOREIGN PATENT DOCUMENTS

| DE | 102013223758 | 5/2014 |
| DE | 102014203470 | 8/2015 |
| DE | 102014220506 | 4/2016 |
| DE | 102015204320 | 9/2016 |

\* cited by examiner

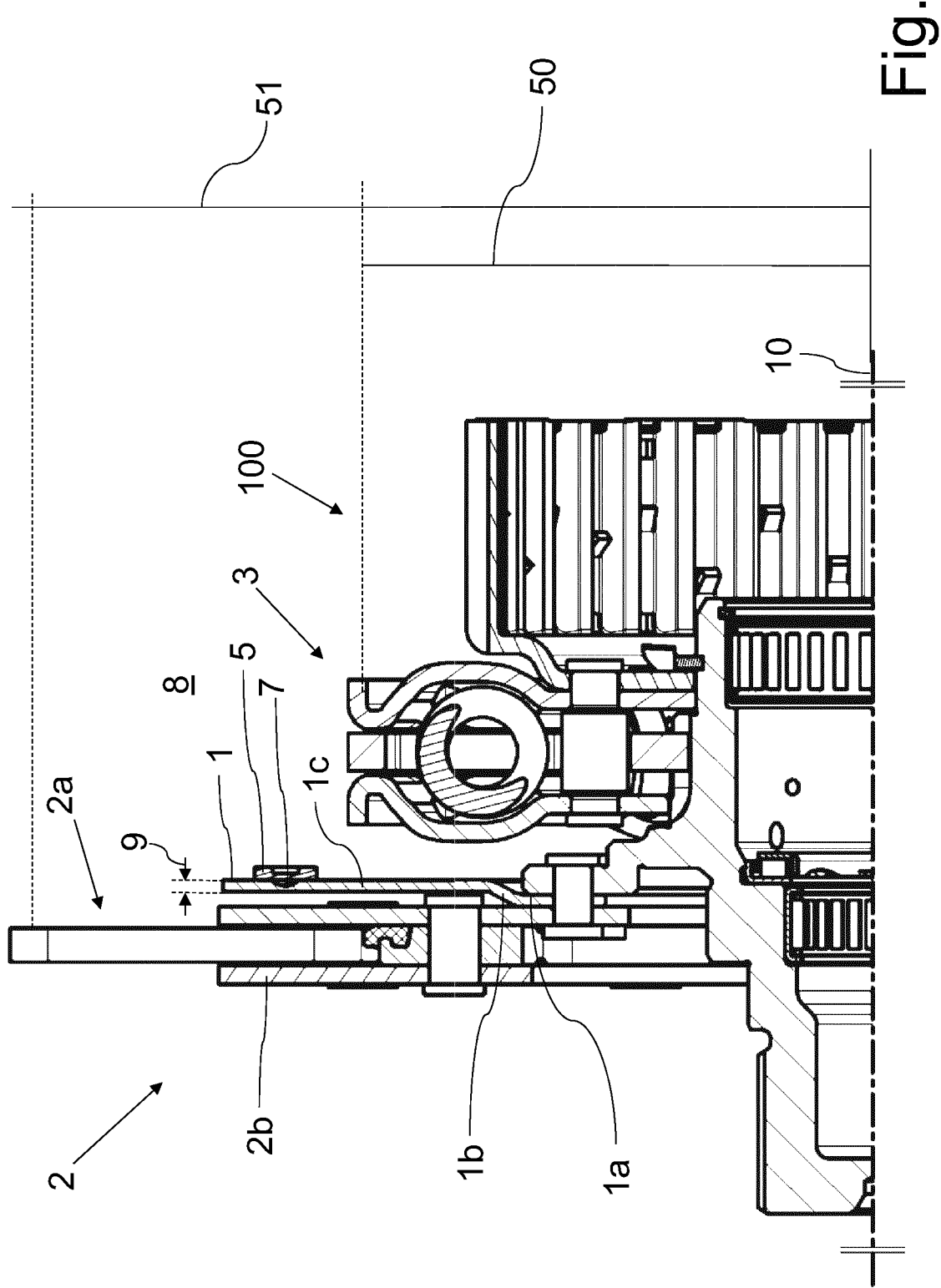

ASSEMBLY FOR A HYBRID DRIVETRAIN OF A MOTOR VEHICLE

CROSS REFERENCE TO RELATED APPLICATIONS

This is a U.S. national stage of Application No. PCT/EP2020/070186 filed Jul. 16, 2020. Priority is claimed on German Application No. DE 10 2019 210 604.8 filed Jul. 18, 2019 the content of which is incorporated herein by reference.

BACKGROUND OF THE INVENTION

1. Field of the Invention

The disclosure relates to an assembly for a hybrid drivetrain of a motor vehicle, comprising a first torque transmission device and a second torque transmission device connected thereto to transmit torque, wherein the first torque transmission device is arranged to be axially spaced apart from the second torque transmission device, and wherein the second torque transmission device has a smaller radial extent than the first torque transmission device, and wherein an installation space for a drivetrain device is defined radially above the second torque transmission device, such that said installation space is delimited axially by the first torque transmission device.

The disclosure further relates to a drivetrain, in particular a hybrid drivetrain of a motor vehicle having an assembly.

Although the present disclosure can be applied in general to any desired torque transmission devices, the present disclosure is described with reference to torque transmission devices in the form of vibration dampers.

2. Description of the Related Art

Hybrid vehicles, as well as conventional motor vehicles, have a drivetrain that is subject to vibration inputs from engines or motors. For this purpose, a vibration decoupling system is introduced in a known manner into the torque transmission path of the drivetrain, e.g. a dual-mass flywheel, an absorber and a torsional damper with an inner disk carrier for a clutch. By the very nature of production, the individual elements of the vibration decoupling system have geometric deviations, which cause an unbalance. In order to compensate for the unbalance, the arrangement of additional masses, both on the absorber and on the inner disk carrier, has been disclosed. The disadvantage with this is that the arrangement of two masses, of which the one on the inner disk carrier is usually arranged radially far inward as a result of the design, and therefore has to be dimensioned to be correspondingly large in order to provide adequate compensation for the unbalance, is complicated and expensive.

DE 10 2014 220 506 A1 discloses a centrifugal pendulum device having a protective device on which an additional mass is arranged on its axial side facing away from the centrifugal pendulum in order to compensate for an unbalance. In this case, the protective device surrounds the centrifugal pendulum device in the radial and axial directions.

US 2008/0017157 A1 discloses an additional mass arranged on a radial outside of a housing of a vibration damper for the purpose of compensating unbalance.

In addition to the unbalance mentioned, assemblies must also be adapted to the most varied customer requirements. Although, in most cases, the basic design of the assembly can be retained, considerably differing requirements with respect to the respective attachment and to the respective installation space, in particular for the absorbers and an electric machine, must be taken into account, for example. Thus, for example, the assembly must be designed individually in a particularly complex manner in order to maintain respective minimum spacings from other components, by inserting individual spacer elements, which in turn require individual unbalance compensation in a complex manner.

SUMMARY OF THE INVENTION

It is therefore an object of one aspect of the present invention to provide an assembly for a hybrid drivetrain of a motor vehicle and a drivetrain, in particular a hybrid drivetrain, of a motor vehicle having an assembly that allows simple adaptation to individual axial spacings and at the same time minimizes the unbalance of the assembly. It is a further object of one aspect of the present invention to specify an alternative assembly for a hybrid drivetrain of a motor vehicle and an alternative drivetrain, in particular a hybrid drivetrain, of a motor vehicle having an assembly.

In one aspect of the present invention an assembly for a hybrid drivetrain of a motor vehicle, comprises a first torque transmission device and a second torque transmission device connected thereto to transmit torque, wherein the first torque transmission device is arranged to be axially spaced apart from the second torque transmission device, and wherein the second torque transmission device has a smaller radial extent than the first torque transmission device, and wherein an installation space for a drivetrain device is defined radially above the second torque transmission device, such that said installation space is delimited axially by the first torque transmission device, in that a spacing device is arranged for axial spacing in the torque transmission path between the two torque transmission devices, which spacing device is designed in such a way that an axially definable minimum spacing between the defined installation space and the first torque transmission device is maintained, and in that the spacing device has a balancing device for compensating an unbalance at least of the assembly.

One of the advantages achieved thereby is that, by virtue of the spacing device, the balancing process, on the one hand, and spacing from other elements of the assembly, on the other hand, is made possible in a simple manner by a single device. In this way, simple and low-cost production of the assembly and of the drivetrain but at the same time also a high degree of flexibility with respect to adaptation to the most varied customer requirements is possible. Another advantage is that an almost uniform production process for the assembly and the drivetrain is made possible.

Further features, advantages and further embodiments of the invention are described below or are disclosed thereby.

According to an advantageous development, the spacing device is arranged radially below the installation space. In this way, a compact installation space for the spacing device and an enlarged, specifiable installation space for the drivetrain device provided are made available.

According to a further advantageous development, the spacing device extends in the radial direction between the first and second torque transmission devices. In this way, the installation space available for the assembly can be utilized efficiently without enlarging it in the radial direction.

According to a further advantageous development, the spacing device has an axial offset in the radial direction. One of the advantages achieved thereby is that, as a result, the spacing device can be adapted to different designs of the two torque transmission devices, and at the same time efficient use of the installation space available for the assembly, which is usually very limited, is made possible. The spacing device, in particular the offset, can be produced by deep-drawing.

According to a further advantageous development, the spacing device has at least one aperture and/or a depression in the circumferential direction. In this way, an unbalance due to mass removal can be compensated or balanced out in a particularly simple manner.

According to a further advantageous development, the spacing device is formed in the region of at least one aperture for receiving an additional mass. It is thus possible in a particularly simple manner to compensate or balance out an unbalance by an additional mass.

According to a further advantageous development, the at least one aperture is designed for the provision of a clamping and/or clip connection. The advantage of this is simple, fast and low-cost retrofit detachable arrangement of an additional mass for unbalance compensation.

According to a further advantageous development, the spacing device has at least one separately arranged additional mass. In this way, it is possible to balance out an unbalance in a particularly simple manner through the arrangement of an additional mass.

According to a further advantageous development, the at least one additional mass is of U-shaped design in cross section. In this way, simple introduction of the additional mass into an aperture is possible. In addition, a substantial part of the additional mass can be arranged further outward radially owing to the U shape, and therefore a higher mass moment of inertia can be made available.

According to a further advantageous development, the at least one additional mass has a horizontal limb. In this way, on the one hand, the ease of handling of the additional mass during its introduction into the aperture is improved and, on the other hand, more additional mass can be made available by the horizontal limb.

According to a further advantageous development, the spacing device has an axial thickness which is constant over its radial extent. This enables the spacing device to be produced easily.

According to a further advantageous development, at least one of the at least two torque transmission devices is designed as an absorber. A vibration damping assembly can thereby be made available.

Further important features and advantages of the invention will be found in the drawings and the associated description of the figures with reference to the drawings.

It is self-evident that the features mentioned above and those that will be explained below can be used not only in the respectively specified combination but also in other combinations or on their own without departing from the scope of one aspect of the present invention.

Preferred embodiments and forms of embodiment of the present invention are illustrated in the drawings and are explained in greater detail in the following description, wherein identical reference signs refer to identical or similar or functionally identical components or elements.

BRIEF DESCRIPTION OF THE DRAWINGS

Here, in schematic illustration
FIG. 4 is an assembly in cross section.

DETAILED DESCRIPTION OF THE PRESENTLY PREFERRED EMBODIMENTS

Figure 1:
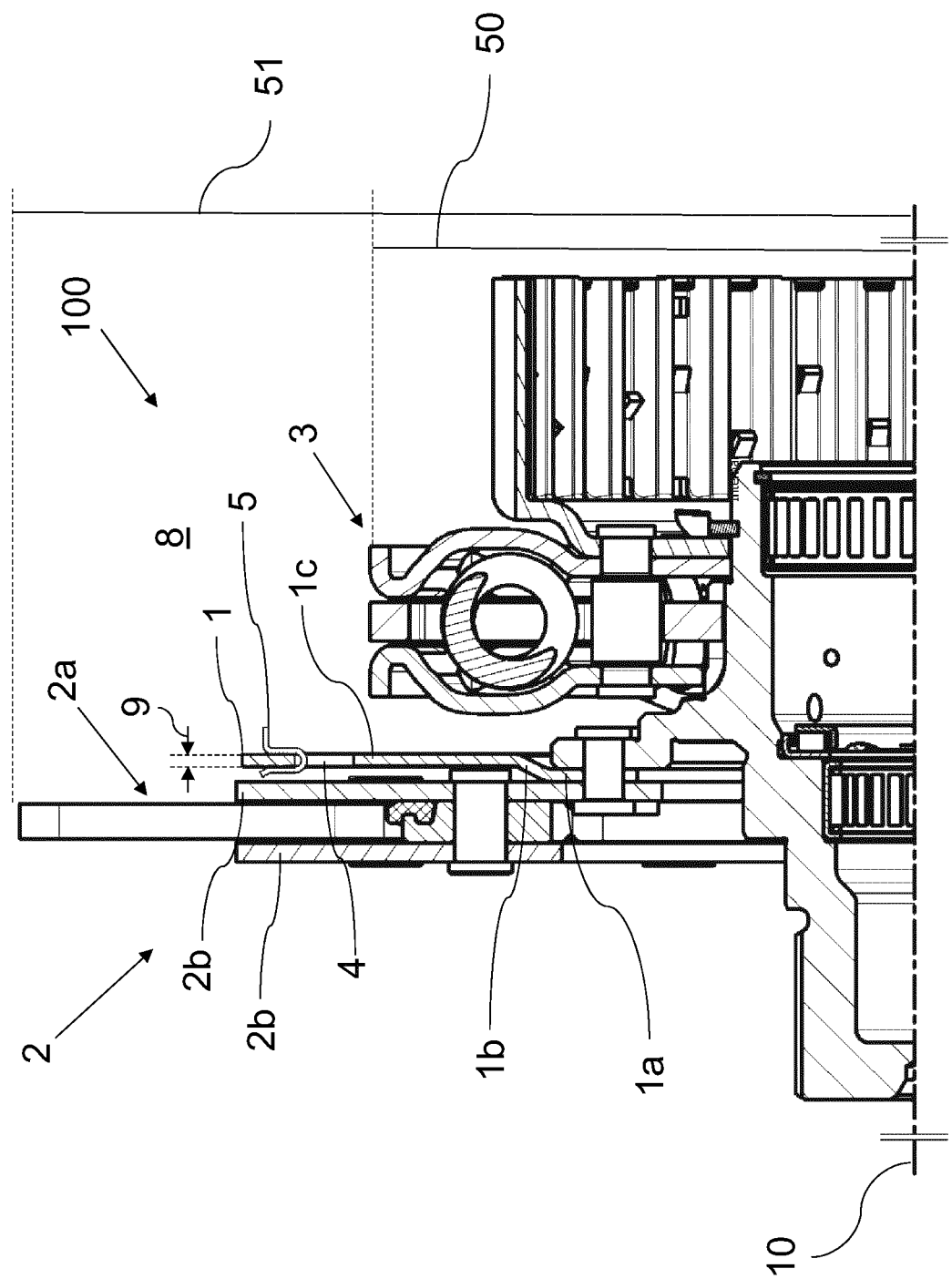
FIG. 1 is an assembly in cross section.

FIG. 1 is an assembly in cross section according to one aspect of the present invention.

An assembly 100 is shown in detail in FIG. 1. The assembly 100 has an absorber 2 with singly packaged flyweights 2a guided by track plates 2b. The output of the absorber 2 is connected in terms of torque to the input of a torsional damper 3, which is constructed in a known manner Above the torsional damper 3, an installation space 8 is provided, in which an electric machine is to be arranged. In this case, the radial extent 51 of the absorber 2 is greater than the radial extent 50 of the torsional damper 3.

For the axial spacing of the absorber 2 and the torsional damper 3, a spacing device 1 of appropriate axial thickness 9 is arranged between the absorber 2 and the torsional damper 3. In this case, the spacing device 1 is of annular design and—like the absorber 2 and torsional damper 3—is rotatable about an axis of rotation 10. Here, the spacing device 1 extends not only in the axial direction but primarily in the radial direction, wherein the spacing device 1 always has the same axial thickness 9. This results essentially in three sections 1a, 1b, 1c. First of all, the spacing device 1 extends outward with a radial section 1a, beginning at the outlet of the absorber 2. Subsequently, the spacing device has an axial offset section 1b away from the absorber 2 and then again extends further outward in the radial direction, parallel to the extent of the track plates 2b and of the flyweights 2a of the absorber 2. At the radial level of the flyweights 2a, the spacing device 1 has apertures 4 arranged in a regular manner in the circumferential direction and into which additional masses 5 are introduced and fixed therein, e.g. by a clip connection. In this case, it is possible in each case not only for an additional mass 5 but also a further additional mass 5 to be arranged at the radially inner and outer ends of the aperture 4. To ensure that these do not slip during a rotary movement, a spacer can be arranged or introduced between the two additional masses 5.

Figure 2:
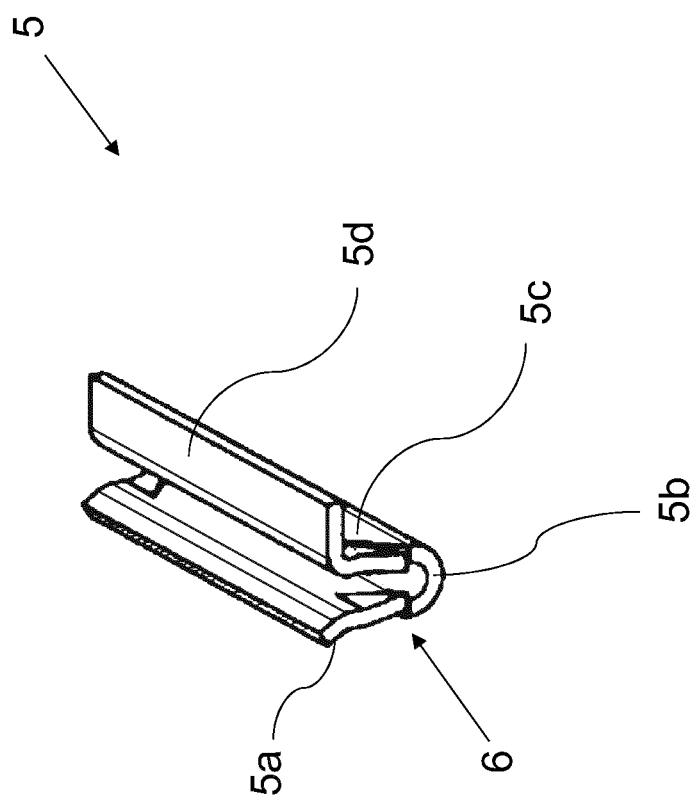
FIG. 2 is an additional mass.

FIG. 2 shows an additional mass according to one aspect of the present invention.

An additional mass 5 for clipping into an aperture is shown in detail in FIG. 2. In this case, the additional mass 5 is of substantially U-shaped design with two vertical limbs 5a, 5c, which are connected by a round limb 5b. The right vertical limb 5c has a horizontal projection or limb 5d at its upper end. Furthermore, the additional mass 5 has projections that extend inward at the edge as part of a clip connection 6. These are intended to secure the additional mass 5 against slipping in the aperture 4.

Figure 3:
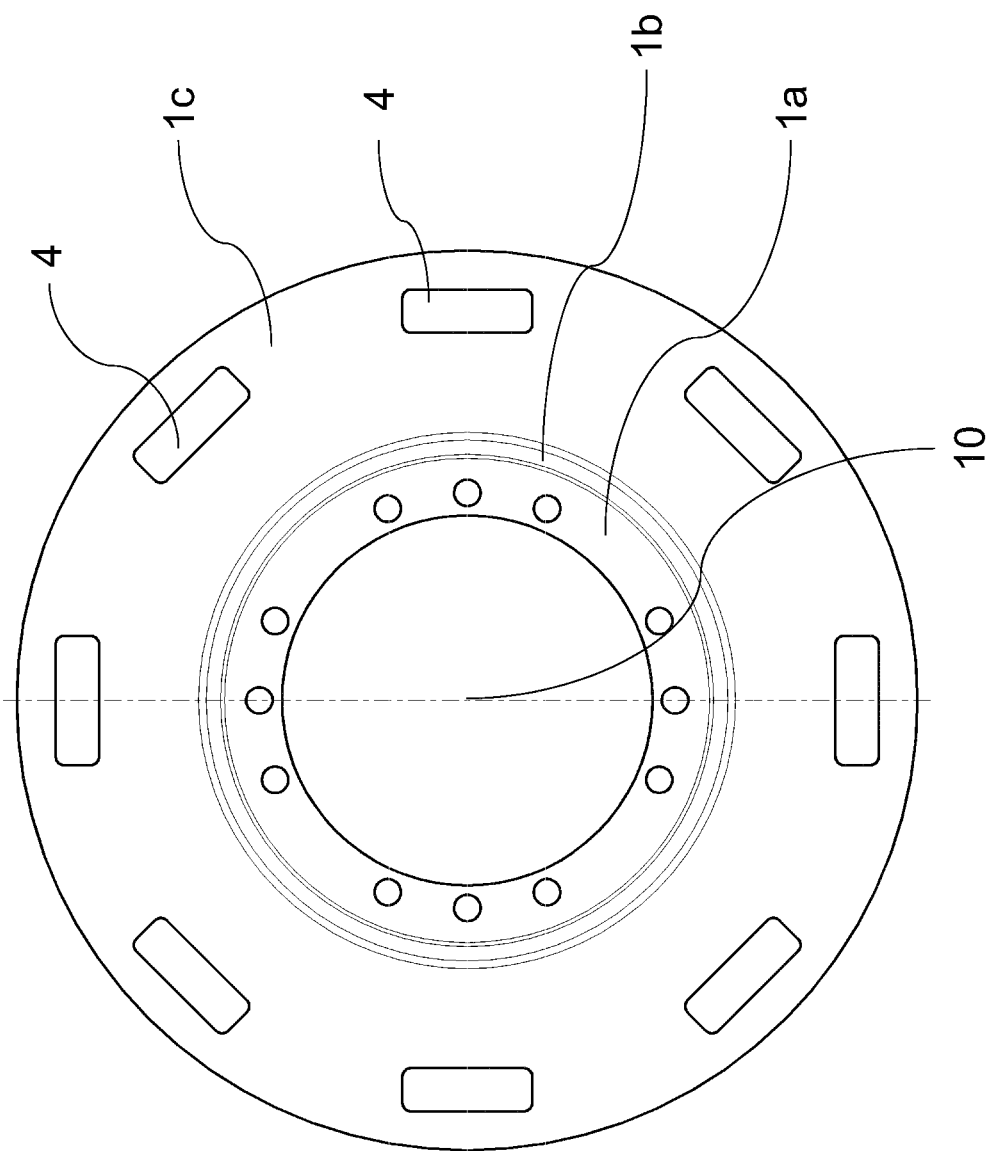
FIG. 3 is a spacing device.

FIG. 3 shows a spacing device according to one aspect of the present invention. A spacing device 1 in the form of a ring is shown in detail in FIG. 3. Here, the spacing device 1 has three sections 1a, 1b, 1c, similarly to the spacing device 1 according to FIG. 1. In the region of the radial outer side of the ring, rounded rectangular apertures 4 are arranged circumferentially at regular intervals of 45 degrees, serving to receive a respective additional mass 5, for example an additional mass according to FIG. 2.

FIG. 4 shows an assembly in cross section according to one aspect of the present invention.

An assembly 100 is shown in detail in FIG. 4. The assembly 100 has an absorber 2 with singly packaged flyweights 2a, which are guided by track plates 2b. The output of the absorber 2 is connected in terms of torque to the input of a torsional damper 3, which is constructed in a known manner Above the torsional damper 3, an installation space 8 is provided, in which an electric machine is to be arranged. In this case, the radial extent 51 of the absorber 2 is greater than the radial extent 50 of the torsional damper 3.

For the axial spacing of the absorber 2 and the torsional damper 3, a spacing device 1 of appropriate axial thickness 9 is arranged between the absorber 2 and the torsional damper 3. In this case, the spacing device 1, like the absorber 2 and torsional damper 3, is of annular design and is rotatable about an axis of rotation 10. Here, the spacing device 1 extends not only in the axial direction but primarily in the radial direction. This results essentially in three sections 1a, 1b, 1c, although the spacing device 1 always has the same axial thickness 9. First of all, the spacing device 1 extends radially outward with a radial section 1a, beginning at the outlet of the absorber 2. Subsequently, the spacing device has an axial offset section 1b away from the absorber 2 and then again extends further outward in the radial direction, parallel to the extent of the track plates 2b and of the flyweights 2a of the absorber 2. At the radial level of the flyweights 2a, the spacing device has an additional mass 5 in the circumferential direction which was arranged retrospectively on the spacing device 1, e.g. by a welded connection 7. In addition, likewise similarly to FIG. 1, apertures and, in particular, additional masses can be arranged to increase the mass moment of inertia and/or to compensate unbalance. Steel, in particular stainless steel, for example, is conceivable as a material for the spacing device and for the additional mass.

In summary, at least one of the aspects of the invention has at least the following advantages:

Unbalance compensation;

Increase of the mass moment of inertia;

High flexibility;

Simple, low-cost production;

Simple application or arrangement of the additional mass;

Low material consumption; and

Effective use of the installation space above the torsional damper possible.

Although the present invention has been described with reference to preferred exemplary embodiments, it is not restricted thereto but can be modified in a variety of ways.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

The invention claimed is:

1. An assembly for a hybrid drivetrain of a motor vehicle, comprising:
   a first torque transmission device;
   a second torque transmission device connected to the first torque transmission device to transmit torque,
      wherein the first torque transmission device is arranged to be axially spaced apart from the second torque transmission device,
      wherein the second torque transmission device has a smaller radial extent than the first torque transmission device, and
      wherein an installation space for a drivetrain device is defined radially above the second torque transmission device, such that the installation space is axially delimited by the first torque transmission device; and
   a spacing device is arranged for axial spacing in a torque transmission path between the a first torque transmission device and the second torque transmission device, the spacing device is designed such that an axially definable minimum spacing between the installation space and the first torque transmission device is maintained, and in that the spacing device has a balancing device for compensating an unbalance of at least the assembly.

2. The assembly as claimed in claim 1, wherein the spacing device is arranged radially below the installation space.

3. The assembly as claimed in claim 1, wherein the spacing device extends in a radial direction between the first torque transmission device and the second torque transmission device.

4. The assembly as claimed in claim 1, wherein the spacing device has an axial offset in a radial direction.

5. The assembly as claimed in claim 1, wherein the spacing device has at least one aperture and/or at least one depression in a circumferential direction.

6. The assembly as claimed in claim 5, wherein the spacing device is formed in a region of the at least one aperture for receiving an additional mass.

7. The assembly as claimed in claim 6, wherein the at least one aperture is configured for a clamping connection and/or a clip connection.

8. The assembly as claimed in claim 1, wherein the spacing device has at least one separately arranged additional mass.

9. The assembly as claimed in claim 8, wherein the at least one separately arranged additional mass is U-shaped in cross section.

10. The assembly as claimed in claim 9, wherein the at least one separately arranged additional mass has a horizontal limb.

11. The assembly as claimed in claim 1, wherein the spacing device has an axial thickness that is constant over its radial extent.

12. The assembly as claimed in claim 1, wherein at least one of the the first torque transmission device and the second torque transmission device is an absorber.

13. A drivetrain of a motor vehicle having an assembly comprising:
   a first torque transmission device;
   a second torque transmission device connected to the first torque transmission device to transmit torque,
   wherein the first torque transmission device is arranged to be axially spaced apart from the second torque transmission device, wherein the second torque transmission device has a smaller radial extent than the first torque transmission device, and wherein an installation space for a drivetrain device is defined radially above the second torque transmission device, such that the installation space is axially delimited by the first torque transmission device; and a spacing device is arranged for axial spacing in a torque transmission path between the a first torque transmission device and the second torque transmission device, the spacing device is designed such that an axially definable minimum spacing between the installation space and the first torque transmission device is maintained, and in that the spacing device has a balancing device for compensating an unbalance of at least the assembly.

14. The drivetrain of claim 13, wherein the drivetrain is a hybrid drivetrain.

* * * * *